(12) United States Patent
Wang

(10) Patent No.: US 7,555,846 B1
(45) Date of Patent: Jul. 7, 2009

(54) WHEELED DISTANCE MEASURING DEVICE

(76) Inventor: Cheng Lin Wang, No. 19, Tonro Street, Tonro Tsuen, Tonro Hsiang, Miauli 36641 (TW)

( * ) Notice: Subject to any disclaimer, the term of this patent is extended or adjusted under 35 U.S.C. 154(b) by 0 days.

(21) Appl. No.: 12/069,498

(22) Filed: Feb. 11, 2008

(51) Int. Cl.
*G01B 3/12* (2006.01)
(52) U.S. Cl. .............................. 33/772; 33/779; 33/782
(58) Field of Classification Search ............ 33/772–782
See application file for complete search history.

(56) References Cited

U.S. PATENT DOCUMENTS

| | | | |
|---|---|---|---|
| 6,892,470 B2 | 5/2005 | Olson et al. | 33/782 |
| 7,040,036 B1 | 5/2006 | Wang | 33/782 |
| 7,111,412 B2 * | 9/2006 | Huang | 33/772 |
| 7,131,216 B2 * | 11/2006 | Nepil | 33/772 |
| 2006/0042112 A1 * | 3/2006 | Nepil | 33/772 |
| 2006/0156573 A1 * | 7/2006 | Huang | 33/772 |
| 2008/0148591 A1 * | 6/2008 | Kao Lin | 33/772 |

* cited by examiner

*Primary Examiner*—Yaritza Guadalupe-McCall
(74) *Attorney, Agent, or Firm*—Charles E. Baxley

(57) ABSTRACT

A wheeled distance measuring device includes a longitudinal pole having two segments, a housing and a casing attached to the segments and pivotally coupled together, a latch device pivotally attached to the housing and having a latch, and a lock device pivotally attached to the casing and having a catch for engaging with the latch of the latch device and for detachably securing the segments together. The casing includes a chamber formed by a wall for receiving the lock device, and a channel formed in the wall for pivotally engaging with a water-drop-shaped pivot member of the lock device and for pivotally attaching and coupling the lock device to the casing.

10 Claims, 4 Drawing Sheets

WHEELED DISTANCE MEASURING DEVICE

BACKGROUND OF THE INVENTION

1. Field of the Invention

The present invention relates to a wheeled distance measuring device, and more particularly to a wheeled distance measuring device including a foldable structure for allowing the distance measuring device to be effectively folded to a compact folding structure and to be selectively and solidly coupled together and for allowing the distance measuring device to be easily operated by the users.

2. Description of the Prior Art

Typical wheeled distance measuring devices comprise a wheel rotatably attached to a frame, and a hinged bracket pivotally coupled to the frame for supporting an operating arm, and for allowing the operating arm and the frame to be selectively folded relative to the frame.

For example, U.S. Pat. No. 6,892,470 to Olson et al. discloses one of the typical wheeled distance measuring devices comprising a wheel rotatably attached or mounted upon a mounting portion of a frame for rotation around a first axis, and an operating arm projecting away from the wheel and pivotable relative to the mounting portion of the frame between an operating state and a store state.

However, the hinged bracket is selectively and detachably secured to the frame with a loop which may not be easily engaged with the hinged bracket and which may have a good chance to be disengaged from the hinged bracket.

U.S. Pat. No. 7,040,036 to Wang discloses another typical wheeled distance measuring devices comprising a longitudinal pole having a lower segment for rotatably attaching or mounting a wheel, and an upper segment rotatably or pivotally secured to the lower segment with a pivot shaft and a quick release fastener for allowing the lower and the upper segments of the longitudinal pole to be rotated or folded relative to each other to a compact folding or storing configuration.

However, the quick release fastener is solidly secured or formed integral with the upper segment and may be easily broken after use.

The present invention has arisen to mitigate and/or obviate the afore-described disadvantages of the conventional wheeled distance measuring devices.

SUMMARY OF THE INVENTION

The primary objective of the present invention is to provide a wheeled distance measuring device including a foldable structure for allowing the distance measuring device to be effectively folded to a compact folding structure and to be selectively and solidly coupled together.

The other objective of the present invention is to provide a wheeled distance measuring device including a structure for allowing the distance measuring device to be easily operated by the users.

In accordance with one aspect of the invention, there is provided a wheeled distance measuring device comprising a longitudinal pole including a first segment and a second segment, and a coupling device including a housing having a bore formed therein for receiving and engaging with the first segment, a latch device pivotally attached to the housing and including a latch extended therefrom, a casing including a bore formed therein for receiving and engaging with the second segment, and the casing being pivotally attached to the housing with a pivot shaft to allow the first and the second segments of the longitudinal pole to be folded relative to each other, and a lock device pivotally attached to the casing with a pivot member to allow the lock device to be pivotally attached to the casing, and the lock device includes a catch extended therefrom for selectively engaging with the latch of the latch device and for detachably securing the first and the second segments of the longitudinal pole together and for allowing the two segments of the longitudinal pole to be easily and quickly folded relative to each other.

The casing includes a chamber formed by at least one wall for receiving the lock device, and includes a channel formed in the wall for pivotally engaging with the pivot member of the lock device and for rotatably or pivotally attaching or coupling the lock device to the casing.

The pivot member of the lock device is preferably including a water drop shape. The pivot member of the lock device is preferably extended from a middle portion of the lock device for pivotally coupling the lock device to the casing.

The catch is extended from a first end portion of the lock device, and a spring member is engaged between the casing and a second end portion of the lock device for biasing and forcing the catch of the lock device to engage with the latch of the latch device and thus for detachably securing the segments of the longitudinal pole together A spring member is further be provided and engaged between the housing and the latch device for biasing the latch of the latch device to engage with the catch of the lock device. The latch device includes a stud extended therefrom for engaging with the spring member.

The housing includes a chamber formed therein for receiving the latch device which is pivotally secured to the housing with a pivot pin. The housing includes at least one seat extended into the chamber of the housing, and includes a recess formed in the seat, and the latch device includes a protrusion extended therefrom and pivotally engaged into the recess of the seat of the housing for pivotally attaching or coupling or securing the latch device to the housing.

The housing includes a compartment formed in an upper portion of the housing, and the casing includes a swelling extended downwardly therefrom for engaging into the compartment of the housing and for solidly securing and coupling the housing and the casing together.

The casing includes a projection extended therefrom, and the lock device includes an extension extended therefrom for latching or engaging with the projection of the casing and for preventing the lock device from being disengaged from the casing even when the catch of the lock device is disengaged from the latch of the latch device.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
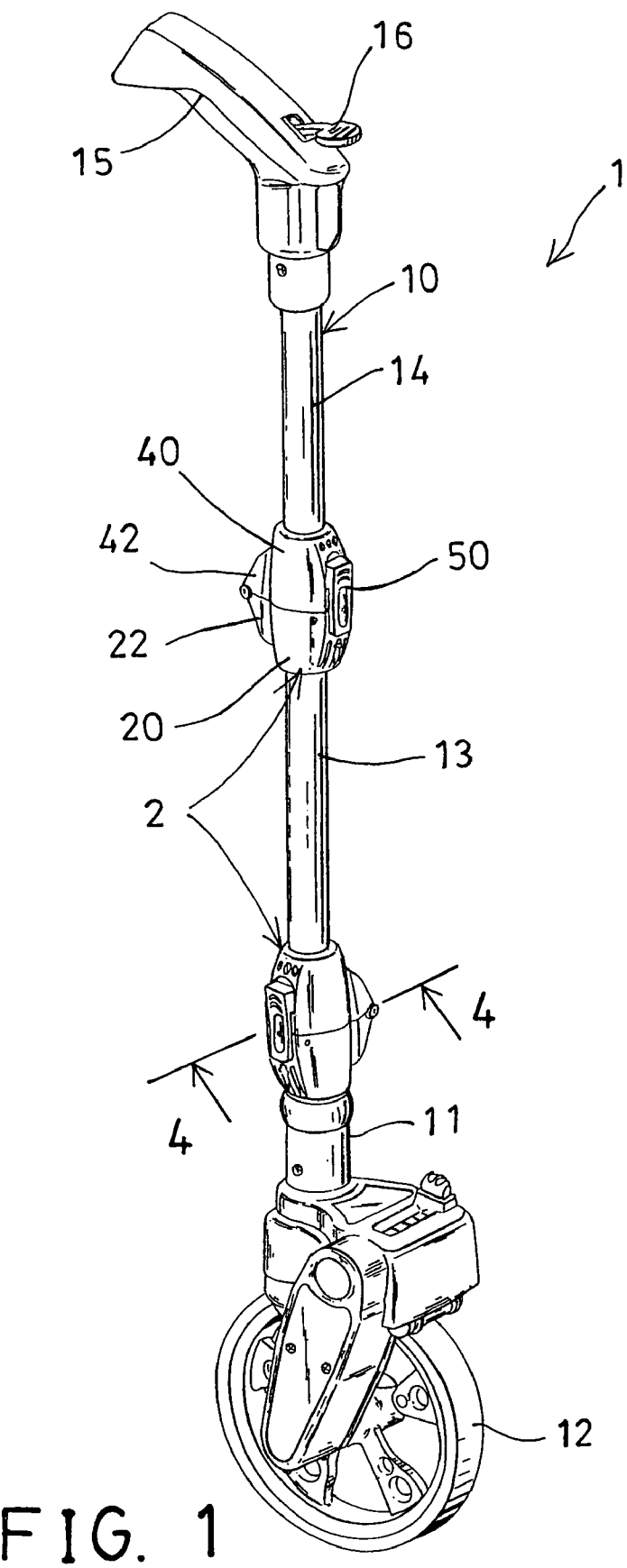
FIG. 1 is a perspective view of a wheeled distance measuring device in accordance with the present invention.
Figure 2:
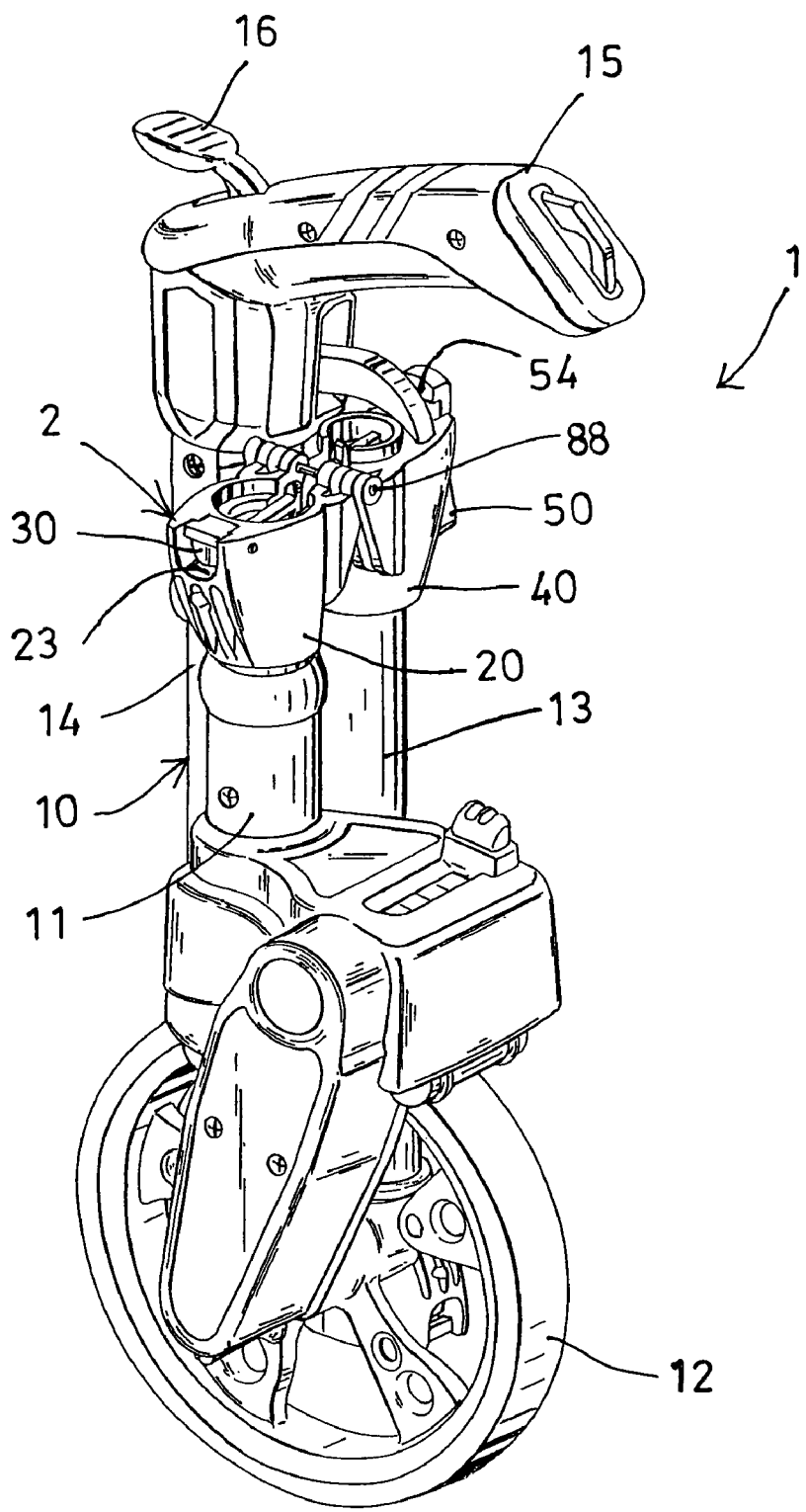
FIG. 2 is a perspective view illustrating the compact folding structure of the wheeled distance measuring device.
Figure 3:
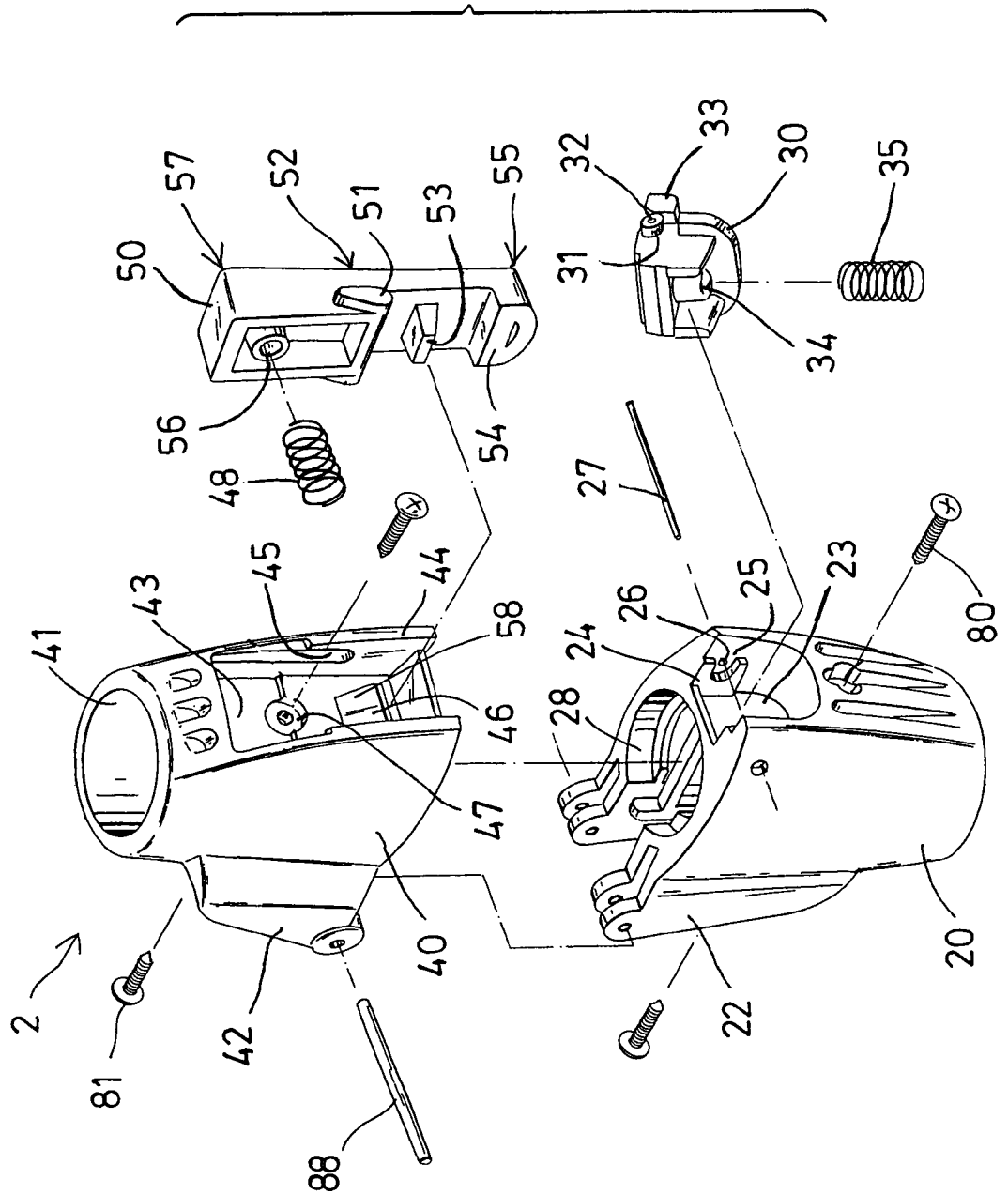
FIG. 3 is a partial exploded view of the wheeled distance measuring device.

Referring to the drawings, and initially to FIGS. 1-4, a wheeled distance measuring device 1 in accordance with the present invention comprises a longitudinal pole 10 including a telescopic or foldable structure having a lower or first segment 11 for rotatably attaching or mounting a wheel 12, and one or more upper or second segments 13, 14 rotatably or pivotally secured together and rotatably or pivotally secured to the lower segment 11 and foldable or rotatable relative to each other to a compact folding or storing configuration (FIG. 2), and one or more (such as two) foldable coupling devices 2 provided and coupled between the segments 11, 13, 14 of the longitudinal pole 10 for allowing the segments 11, 13, 14 of the longitudinal pole 10 to be effectively folded to the compact folding or storing configuration (FIG. 2) and to be selectively and solidly coupled together to the working position (FIG. 1).

One of the foldable coupling devices 2 is illustrated and disclosed hereinafter and includes a housing 20 having a bore 21 formed in the lower portion thereof for receiving or engaging with one of the segments 11, 13 and for securing to the segment 11, 13 with one or more fasteners 80, and having an ear 22 extended from one side portion thereof, and having a chamber 23 formed in the other side portion thereof and facing away from the ear 22, and having one or more (such as two) seats 24 oppositely extended into the chamber 23 of the housing 20, and having a recess 25 formed in each of the seats 24, and having an aperture 26 formed through the housing 20 and intersecting or communicating with the recesses 25 of the seats 24 of the housing 20 for receiving or engaging with a pivot pin 27, and having a compartment 28 formed in the upper portion of the housing 20.

A latch device 30 includes one or more (such as two) protrusions 31 laterally extended outwardly therefrom and rotatably or pivotally engaged into the recesses 25 of the seats 24 of the housing 20 for rotatably or pivotally attaching or securing the latch device 30 to the housing 20, and includes an orifice 32 formed therein, and preferably formed through the protrusions 31 for receiving or engaging with the pivot pin 27 and for further solidly and rotatably or pivotally securing the latch device 30 to the housing 20, and includes a latch 33 extended forwardly and directed and faced away from the ear 22, and extended out of the chamber 23 of the housing 20, and includes a stud 34 extended downwardly therefrom, and includes a spring member 35 engaged with the stud 34 and engaged with the housing 20 for biasing and forcing the latch 33 downwardly.

A casing 40 includes a bore 41 formed in the upper portion thereof for receiving or engaging with the other segment 13, 14 and for securing to the segment 13, 14 with one or more fasteners 81, and includes an ear 42 extended from one side portion thereof for rotatably or pivotally attaching or securing to the ear 22 of the housing 20 with a pivot shaft 88 to allow the segments 11, 13, 14 of the longitudinal pole 10 to be rotated or folded relative to each other, and includes a chamber 43 formed in the other side portion thereof and facing away from the ear 42 and formed or defined between two walls 44, and includes one or more (such as two) channels 45 oppositely formed in each of the walls 44, and includes a latch or tongue or projection 46 extended into the chamber 43 of the casing 40.

The casing 40 further includes a socket opening 47 formed therein and intersecting or communicating with the chamber 43 of the casing 40 for receiving or engaging with another spring member 48, and includes a swelling 49 extended downwardly therefrom (FIGS. 4, 5) for engaging into the upper compartment 28 of the housing 20 and for further solidly securing and coupling the housing 20 and the casing 40 together and for preventing the housing 20 and the casing 40 from shifting or moving laterally relative to each other. A lock device 50 further provided and attached or secured to the casing 40 for selectively engaging with the housing 20 and/or the latch device 30 and for detachably securing the housing 20 and the casing 40 together.

For example, the lock device 50 includes one or more (such as two) protrusions or pivotal members 51 oppositely and laterally extended out from the middle portion 52 thereof and each having a water drop shape and rotatably or pivotally engaged into the channels 45 of the walls 44 of the casing 40 respectively for rotatably or pivotally attaching or securing the lock device 50 to the casing 40, and includes an extension 53 and a catch 54 extended from the lower portion or one end portion 55 of the lock device 50 for selectively engaging with the projection 46 of the casing 40 and the latch 33 of the latch device 30 respectively, and includes a hub 56 formed or provided in the other end portion 57 thereof for receiving or engaging with the spring member 48 which may bias and force the extension 53 and the catch 54 of the lock device 50 to engage with the projection 46 of the casing 40 and the latch 33 of the latch device 30 respectively.

Figure 4:
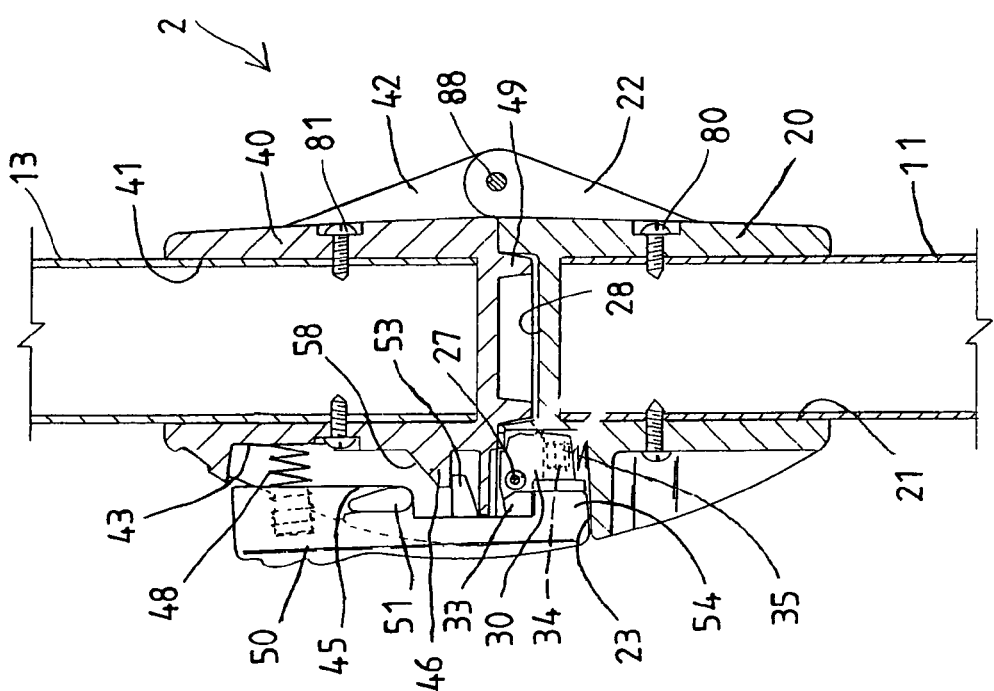
FIG. 4 is a partial cross sectional view of the wheeled distance measuring device.

In operation, as shown in FIG. 4, the catch 54 of the lock device 50 may be biased and forced to engage with the latch 33 of the latch device 30 with or by the spring member 48 which is engaged between the casing 40 and the other end portion 57 of the lock device 50. When it is required to rotate or fold the segments 11, 13, 14 of the longitudinal pole 10 relative to each other, as shown in FIG. 5, the other end portion 57 of the lock device 50 may be depressed toward the casing 40 by depressing the spring member 48 disengage the catch 54 of the lock device 50 from the latch 33 of the latch device 30 and thus to allow the segments 11, 13, 14 of the longitudinal pole 10 to be bent or rotated or folded relative to each other.

Figure 5:
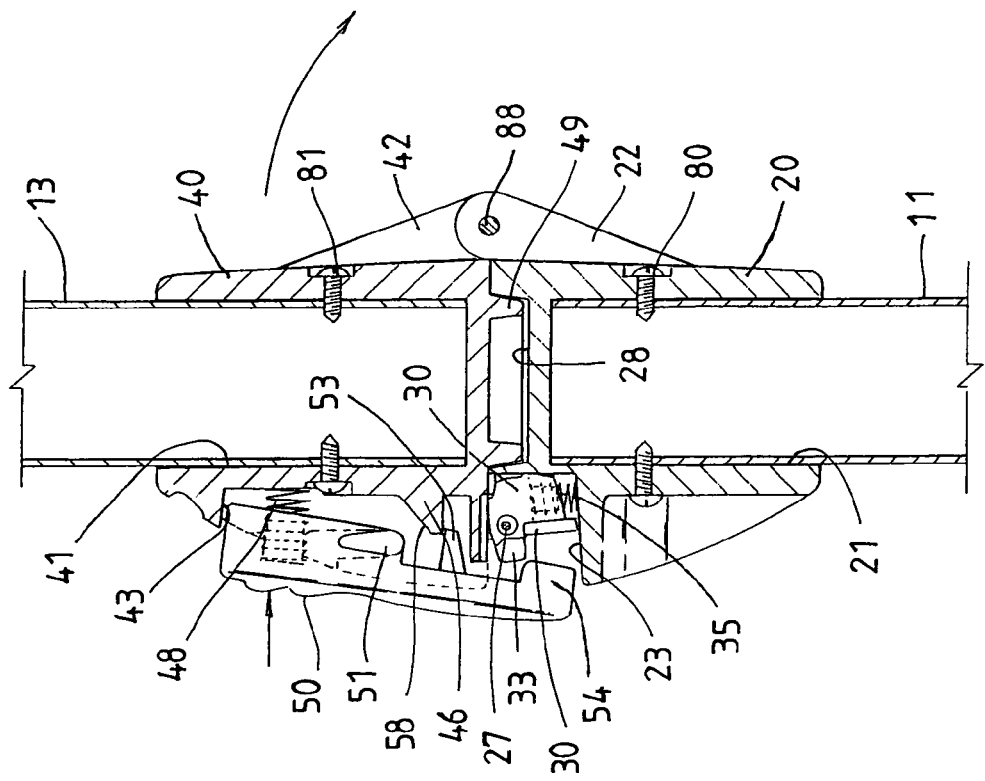
FIG. 5 is a partial cross sectional view similar to FIG. 4, illustrating the operation of the wheeled distance measuring device.

It is to be noted that, as also shown in FIG. 5, the projection 46 of the casing 40 and the extension 53 of the lock device 50 are arranged to be still engaged with each other even when the catch 54 of the lock device 50 is disengaged from the latch 33 of the latch device 30 for stably coupling and retaining the lock device 50 to the casing 40 and for preventing the lock device 50 from being disengaged from the casing 40, and even when the other end portion 57 of the lock device 50 is depressed toward and to contact and to engage with the casing 40, or when the catch 54 of the lock device 50 is disengaged from the latch 33 of the latch device 30. The casing 40 may include a tilted or inclined surface 58 formed on the upper portion of the projection 46 for slidably engaging with the extension 53 of the lock device 50 and for allowing the extension 53 of the lock device 50 to be moved over the projection 46 of the casing 40 when the pivotal members 51 of the lock device 50 are engaged into the channels 45 of the walls 44 of the casing 40 respectively.

It is further to be noted that the lock device 50 is rotatably or pivotally attached or secured to the casing 40 with the pivotal members 51 that are oppositely and laterally extended out from the middle portion 52 of the lock device 50 for allowing the lock device 50 to be freely rotated relative to the casing 40 and for allowing the working life of the lock device 50 to be greatly increased. In addition, the latch 33 of the latch device 30 may be biased and forced to move downwardly in order to stably and solidly engage with the catch 54 of the lock device 50 and to prevent the latch 33 of the latch device 30 from being disengaged from the catch 54 of the lock device 50 inadvertently. The longitudinal pole 10 may further a hand grip 15 and an actuating member 16 provided or attached on top of the uppermost segment 14 for operating the wheeled distance measuring device 1.

Accordingly, the wheeled distance measuring device in accordance with the present invention includes a foldable structure for allowing the distance measuring device to be effectively folded to a compact folding structure and to be selectively and solidly coupled together and for allowing the distance measuring device to be easily operated by the users.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A wheeled distance measuring device comprising:
   a longitudinal pole including a first segment and a second segment,
   a coupling device including a housing having a bore formed therein for receiving and engaging with said first segment,
   a latch device pivotally attached to said housing and including a latch extended therefrom,
   a casing including a bore formed therein for receiving and engaging with said second segment, and said casing being pivotally attached to said housing with a pivot shaft to allow said first and said second segments of said longitudinal pole to be folded relative to each other, and
   a lock device pivotally attached to said casing with a pivot member to allow said lock device to be pivotally attached to said casing, and said lock device including a catch extended therefrom for selectively engaging with said latch of said latch device and for detachably securing said first and said second segments of said longitudinal pole together, said catch being extended from a first end portion of said lock device, and a spring member being engaged between said casing and a second end portion of said lock device for biasing said catch of said lock device to engage with said latch of said latch device.

2. The wheeled distance measuring device as claimed in claim 1, wherein said casing includes a chamber formed by at least one wall for receiving said lock device, and includes a channel formed in said at least one wall for pivotally engaging with said pivot member of said lock device and for pivotally attaching said lock device to said casing.

3. The wheeled distance measuring device as claimed in claim 2, wherein said pivot member of said lock device includes a water drop shape.

4. The wheeled distance measuring device as claimed in claim 2, wherein said pivot member of said lock device is extended from a middle portion of said lock device.

5. The wheeled distance measuring device as claimed in claim 1, wherein said housing includes a chamber formed therein for receiving said latch device which is pivotally secured to said housing with a pivot pin.

6. The wheeled distance measuring device as claimed in claim 5, wherein said housing includes at least one seat extended into said chamber of said housing, and includes a recess formed in said at least one seat, and said latch device includes a protrusion extended therefrom and pivotally engaged into said recess of said at least one seat of said housing for pivotally attaching said latch device to said housing.

7. The wheeled distance measuring device as claimed in claim 1, wherein said housing includes a compartment formed in an upper portion of said housing, and said casing includes a swelling extended therefrom for engaging into said compartment of said housing and for solidly securing and coupling said housing and said casing together.

8. The wheeled distance measuring device as claimed in claim 1, wherein said casing includes a projection extended therefrom, and said lock device includes an extension extended therefrom for engaging with said projection of said casing and for preventing said lock device from being disengaged from said casing when said catch of said lock device is disengaged from said latch of said latch device.

9. A wheeled distance measuring device comprising:
   a longitudinal pole including a first segment and a second segment,
   a coupling device including a housing having a bore formed therein for receiving and engaging with said first segment,
   a latch device pivotally attached to said housing and including a latch extended therefrom,
   a casing including a bore formed therein for receiving and engaging with said second segment, and said casino being pivotally attached to said housing with a pivot shaft to allow said first and said second segments of said longitudinal pole to be folded relative to each other,
   a lock device pivotally attached to said casing with a pivot member to allow said lock device to be pivotally attached to said casing, and said lock device including a catch extended therefrom for selectively engaging with said latch of said latch device and for detachably securing said first and said second segments of said longitudinal pole together, and
   a spring member engaged between said housing and said latch device for biasing said latch of said latch device to engage with said catch of said lock device.

10. The wheeled distance measuring device as claimed in claim 9, wherein said latch device includes a stud extended therefrom for engaging with said spring member.

* * * * *